United States Patent
Dubosc et al.

(10) Patent No.: US 10,464,475 B2
(45) Date of Patent: Nov. 5, 2019

(54) LIGHTING DEVICE FOR IDENTIFICATION OF THE TYPE OF PROPULSION OF A MOTOR VEHICLE

(71) Applicant: VALEO VISION, Bobigny (FR)

(72) Inventors: Christophe Dubosc, Bobigny (FR); Denis Manceau, Bobigny (FR); Remi Mathieu, Bobigny (FR); Edmond Pilla, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/922,205

(22) Filed: Mar. 15, 2018

(65) Prior Publication Data

US 2018/0264998 A1 Sep. 20, 2018

(30) Foreign Application Priority Data

Mar. 15, 2017 (FR) ...................... 17 52120

(51) Int. Cl.
*B60Q 1/50* (2006.01)
*B60Q 1/18* (2006.01)
*G08B 5/36* (2006.01)

(52) U.S. Cl.
CPC ............... *B60Q 1/50* (2013.01); *B60Q 1/18* (2013.01); *B60Q 1/506* (2013.01); *G08B 5/36* (2013.01); *B60Q 2400/50* (2013.01)

(58) Field of Classification Search
CPC . B60Q 1/18; B60Q 1/50; B60Q 1/506; B60Q 2400/50; G08B 5/36
USPC ........................................................ 340/468
See application file for complete search history.

(56) References Cited

U.S. PATENT DOCUMENTS

| | | | | |
|---|---|---|---|---|
| 3,704,446 A | * | 11/1972 | Walter ................... | B60Q 1/442 315/77 |
| 5,815,073 A | * | 9/1998 | Gomez ................... | B60Q 1/52 340/436 |
| 2009/0040032 A1 | * | 2/2009 | Gerber ................... | B60Q 1/503 340/438 |
| 2011/0095878 A1 | * | 4/2011 | Skaff ..................... | B60K 6/445 340/441 |
| 2011/0199199 A1 | * | 8/2011 | Perkins .................. | B60Q 1/506 340/435 |
| 2011/0227719 A1 | * | 9/2011 | Meurle .................. | B60K 6/365 340/468 |
| 2011/0261970 A1 | * | 10/2011 | Hamelink ............. | G10K 15/02 381/71.4 |

(Continued)

FOREIGN PATENT DOCUMENTS

| | | |
|---|---|---|
| DE | 10 2008 059 147 A1 | 6/2010 |
| FR | 2 921 602 | 4/2009 |
| FR | 2 944 491 | 10/2010 |

OTHER PUBLICATIONS

French Preliminary Search Report dated Oct. 16, 2017 in French Application 17 52120, filed on Mar. 15, 2017 (with English Translation of Categories of cited documents).

*Primary Examiner* — Ojiako K Nwugo
(74) *Attorney, Agent, or Firm* — Oblon, McClelland, Maier & Neustadt, L.L.P.

(57) ABSTRACT

A lighting device for a motor vehicle, the lighting device being designed to emit at least one light beam, at least one characteristic of which relates to the type of propulsion of the motor vehicle, the device being arranged to emit the light beam at least when the motor vehicle is moving.

16 Claims, 3 Drawing Sheets

(56) References Cited

U.S. PATENT DOCUMENTS

| | | | |
|---|---|---|---|
| 2012/0126969 A1* | 5/2012 | Wilbur | B60Q 1/506 340/466 |
| 2012/0166042 A1* | 6/2012 | Kokido | B60Q 5/008 701/36 |
| 2012/0242466 A1* | 9/2012 | Stillfried | B60L 11/1861 340/425.5 |
| 2013/0141231 A1* | 6/2013 | Aberizk | B60Q 1/302 340/467 |
| 2013/0154815 A1* | 6/2013 | Min | B60Q 1/085 340/425.5 |
| 2013/0201714 A1* | 8/2013 | Huang-Tsai | B60Q 1/323 362/545 |
| 2014/0159885 A1* | 6/2014 | Chang | G08G 1/167 340/435 |
| 2014/0210608 A1* | 7/2014 | Yamada | G07C 5/00 340/459 |
| 2014/0218946 A1* | 8/2014 | Fritz | B60Q 1/2665 362/465 |
| 2015/0260841 A1* | 9/2015 | Kuo | G01S 13/931 342/70 |
| 2016/0195230 A1* | 7/2016 | Grosdidier | B60Q 3/64 362/511 |
| 2016/0229335 A1* | 8/2016 | Geller | B60Q 1/30 |
| 2017/0039084 A1* | 2/2017 | Atsmon | G06F 9/45558 |
| 2017/0262715 A1* | 9/2017 | Kozuka | B60R 1/00 |
| 2017/0276780 A1* | 9/2017 | Takehara | G01S 7/006 |

\* cited by examiner

LIGHTING DEVICE FOR IDENTIFICATION OF THE TYPE OF PROPULSION OF A MOTOR VEHICLE

The invention relates to the field of lighting and/or of signalling lights. More particularly, the invention relates to signalling lights for vehicles with drives of the electric or hybrid type.

The increase in pollution factors, and notably in the emission of pollutants by vehicles using propulsion by an engine of the thermal type (or internal combustion), are today leading to the establishment of regulations that are increasingly strict encompassing these factors. The appearance is for example observed of prohibitions against driving such vehicles in an urban environment during peaks in pollution or else within specific areas known as LTAs (limited traffic areas) excluding these vehicles. Conversely, driving vehicles with propulsion by a drive of the electric type, whether this be partially electric (also known as hybrid) or totally electric, is authorized during peaks in pollution or within the LTAs.

Accordingly, it is necessary to be able to identify these vehicles with drives of the electric type, and easily differentiate them from the other types of vehicles, for example in order to facilitate the monitoring operations in urban environments and LTAs by the authorities, and thus to avoid traffic congestion.

Furthermore, the recent development of the technologies relating to electric batteries and electric motors has allowed the cost of vehicles with electric-type drives to be reduced and their driving autonomy to be lengthened, which is causing an increase in the installed base of electric motor cars.

Nevertheless, in an urban environment exhibiting a high level of ambient noise, it may be difficult to discern the approach of a vehicle with electric-type drive, by nature particularly silent and whose noise will melt into this ambient noise level. The discretion of these vehicles is, as a consequence, likely to cause accidents with other road users, such as pedestrians or cyclists, not having detected them. There accordingly exists a need to indicate the movement of these vehicles with electric-type drive to the other road users, in order to minimize the probability of an accident.

The aim of the invention is to provide a solution addressing at least one of the needs identified hereinabove.

The subject of the invention is thus a lighting device for a motor vehicle, the lighting device being designed to emit at least one light beam, at least one characteristic of which relates to the type of propulsion of the said motor vehicle, the said device being arranged to emit the said light beam at least when the said motor vehicle is moving.

The use of a light characteristic of the type of propulsion used by the vehicle therefore allows the latter to be differentiated from the vehicles having a more polluting type of propulsion, and also allows the other road users to be warned of the movement of this vehicle.

The light beam thus performs a signalling function for the said motor vehicle, necessarily visible by an outside observer or a user of the road situated outside of the motor vehicle.

Advantageously, the device comprises a control unit arranged for controlling the emission of the said light beam by the lighting device when the said motor vehicle is moving.

According to one advantageous embodiment of the invention, the said lighting device is arranged so that the said light beam indicates, to an observer outside of the vehicle, the type of drive of the said motor vehicle. The said characteristic of the light beam is thus linked to the type of motor used by the motor vehicle, and can immediately be seen by the outside observer who can directly identify the type of drive used. It may be designed for the light beam to exhibit several characteristics, each linked to the type of motor used by the vehicle.

If desired, the said lighting device may be arranged for the said characteristic to be varied as a function of a variation over time of a pollution factor of the vehicle, when the vehicle is moving or over the lifetime of the vehicle, and notably as a function of the variation over time of at least one parameter chosen from amongst the following parameters:

the quantity of pollutants, and notably the quantity of $CO_2$, emitted by the motor vehicle, the driving mode of the motor vehicle selected by the driver of the vehicle, and notably the selection of a driving mode from amongst the driving modes: sport, normal or ecological, the speed of the motor vehicle, the loaded weight of the motor vehicle.

In this way, a hardening of anti-pollution regulations, which might place a greater restriction on the driving of polluting vehicles, may be pre-empted. The differentiation between polluting and non-polluting vehicles may also be improved.

As a variant, the said characteristic may be fixed.

Advantageously, the said lighting device is arranged to emit the said light beam when the motor vehicle is being driven within a predetermined traffic area. Accordingly, the identification of the type of motor used by the motor vehicle may be applied only when it is necessary, notably when the vehicle is being driven during a peak of pollution or within an LTA. Where desired, the control unit may be equipped with means for determining the type of area in which the motor vehicle is being driven, which may for example be a GPS and/or means of communication with an urban infrastructure.

Advantageously, the lighting device is arranged so that the said characteristic relating to the type of propulsion of the said motor vehicle is a wavelength of the light beam emitted by the lighting device. It may for example be arranged for the lighting device to emit a blue light beam when the motor vehicle comprises a drive of the electric-only type, a green light when the vehicle comprises a drive of the hybrid type, and a yellow light when the vehicle comprises a drive of the thermal-only type. As a variant, the said characteristic may be a colour temperature of a white light.

Alternatively or additionally, the lighting device may be arranged so that the said characteristic relating to the type of propulsion of the said motor vehicle is the frequency of a pulsation in the light beam emitted by the lighting device. It may for example be provided for the emission of a pulsed light beam by the lighting device when the motor vehicle comprises a drive of the partially or totally electric type and of a continuous light beam when the motor vehicle comprises an engine of the thermal type.

Alternatively or additionally, the lighting device may be arranged so that the said characteristic relating to the type of propulsion of the said motor vehicle is a pattern formed by the light beam emitted by the lighting device. Where desired, the said pattern may be projected onto the road by the lighting device or displayed on a screen of the lighting device.

The invention also covers a lighting device which emits a light beam only if the motor vehicle is equipped with a drive of the partially or totally electric type. In this case, only a vehicle with an electric motor would identify itself as such by a light beam, the vehicles with a thermal engine not emitting any identification light beam.

According to one advantageous embodiment of the invention, since the said motor vehicle is a vehicle with a propulsion that is at least partially electric, the said lighting device is arranged so that the said light beam indicates to a road user the movement of the said motor vehicle. Where desired, the said characteristic relating to the type of propulsion of the said motor vehicle relates to a propulsion referred to as a silent propulsion. 'Silent propulsion' is understood to mean a propulsion by which the motor vehicle moves while generating noise according to a sound level lower than that of a vehicle with a solely thermal propulsion, for example less than or equal to 60 dBA when the motor vehicle is going at 20 km/h.

Advantageously, the lighting device is arranged so as to project the said light beam towards the road user. If desired, the lighting device may be arranged so that the said characteristic relating to the type of propulsion of the said motor vehicle is a pattern formed by the light beam emitted by the lighting device. Advantageously, the lighting device may be arranged so as to project the said pattern in an area of the road user determined as a function of the position of the road user and of the movement of the said motor vehicle. Where desired, the control unit may be equipped with means for detecting the presence of a road user to be warned, for determining the type of the road user and the position of the road user and/or with means for analyzing and/or for predicting the movement of the motor vehicle.

As a variant, the lighting device may be arranged so as to project the said light beam onto an area surrounding, partially or completely, the said motor vehicle.

If desired, the lighting device may be arranged to emit a sound concomitantly with the emission of the light beam.

According to one embodiment of the invention, the lighting device comprises a light source designed to emit light rays, potentially associated with optical means arranged so as to form and to project onto the road and/or onto a screen the light beam using the said light rays.

Advantageously, the light source may comprise an elementary source designed to emit light rays of a predetermined wavelength. If desired, the light source may comprise several elementary sources, notably three elementary sources, each designed to emit light rays of a separate predetermined wavelength, notably red, green and blue. Potentially, the light source may comprise a matrix of elementary sources, notably selectively activatable by the control unit.

Advantageously, the or each elementary source may be a semiconductor light-emitting source, notably a light-emitting diode, a laser diode, an organic light-emitting diode, a chip of a photoluminescent material.

Where desired, the lighting device may comprise one or more of the following assemblies:
- a housing closed by a screen and receiving the light source, the housing and/or the screen being composed of a diffusing material in order to diffuse (or scatter) light rays emitted by the light source through the screen;
- a light guide, notably a tubular, surface or else a fibre optic light guide comprising a coupling region for receiving light rays emitted by the light source and coupling them into the light guide and a decoupling region for diverting the light rays propagating in the light guide towards the outside of the lighting device or onto a screen of the lighting device;
- a lens and/or a reflector and/or a collimator for diverting light rays emitted by the light source towards the outside of the lighting device or onto a screen of the lighting device;
- a matrix of micro-mirrors, each micro-mirror being mobile between at least a first position in which a portion of the light rays emitted by the light source is diverted towards the outside of the lighting device or onto a screen of the lighting device and a second position in which the said portion is diverted towards the interior of the lighting device;
- a scanning device, notably a microelectromechanical system (MEMS), designed to scan, notably by reflection, light rays emitted by the light source over a plate made of photoluminescent material, a portion of the said light rays being converted by the plate and another portion being scattered by the plate, all of the converted and scattered portions being diverted by the plate towards the outside of the lighting device or onto a screen of the lighting device.

According to one embodiment of the invention, the lighting device may form a part or the whole of one or more pieces of equipment of the motor vehicle, and notably of one or more of the following pieces of equipment:
- a door handle;
- an external wing mirror;
- a front headlamp;
- a rear light;
- a raised stop light;
- a device for illuminating the windscreen;
- a device for illuminating a license plate;
- an aerial;
- a wheel rim;
- a logo;
- a part of the bodywork, and notably a pillar, a door sill, a spoiler, a radiator grill.

Advantageously, the lighting device may be arranged so that the said light beam carries out a part or the whole of a predetermined regulatory lighting function, and notably a daytime running light, a position light, a stop light or a direction indicator.

Another subject of the invention is a motor vehicle comprising a lighting device according to the invention. Where desired, the motor vehicle may be equipped for its propulsion with a drive of the partially or totally electric type.

Advantageously, the motor vehicle comprises several lighting devices according to the invention. If desired, the motor vehicle may comprise a control unit controlling all the lighting devices according to the invention of the vehicle.

Other features and advantages of the present invention will be better understood with the aid of the description and of the drawings, amongst which:

FIG. 1A illustrates a motor vehicle 2 equipped with a thermal engine according to the prior art. This vehicle 2 is lacking any lighting device allowing the type of drive with which it is equipped to be identified.

FIG. 1B illustrates a motor vehicle 3 equipped with a drive of the hybrid type, in other words partially electric.

Figure 1A:
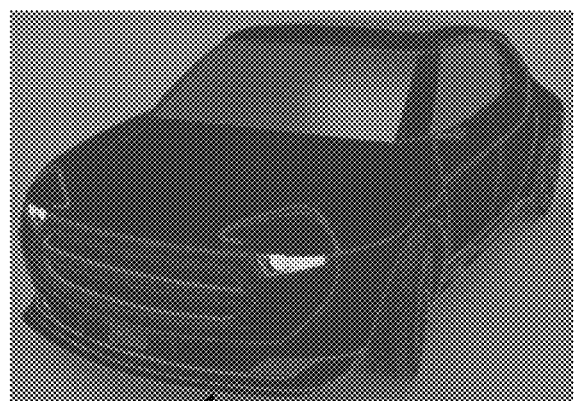
FIG. 1A is a view of a vehicle equipped with a thermal engine according to the prior art.

This vehicle 3 comprises a first lighting device 31 forming a logo disposed on the bodywork of the vehicle. This lighting device 31 comprises for example an optical system (not shown) comprising a light source emitting violet light and a housing closed by a screen, the screen being partially masked so as to form the contours of the logo. The housing receives the light source and the housing and the screen are made of a diffusing material so as to diffuse light rays emitted by the light source through the non-masked parts of the screen.

The vehicle 3 also comprises a second lighting device 32 integrated into a radiator grill of the vehicle and a third lighting device 33 forming a spoiler disposed on an upper part of the bodywork of the vehicle. The devices 32 and 33 each comprise an optical system (not shown) conforming to that of the device 31 comprising a light source emitting violet light.

Lastly, the vehicle 3 comprises means (not shown) for determining the type of area in which the vehicle 3 is travelling and a control unit (not shown) arranged for controlling the switching the light sources of the devices 31 to 33 on or off depending on the type of area determined by the determination means.

When the determination means determine that the vehicle is travelling within a limited traffic area LTA, excluding vehicles with a thermal engine, the control unit sends a command to switch on the light sources of the devices 31 to 33, in such a manner that these devices each emit a violet light beam allowing the type of drive of the said vehicle 3 to be indicated to an outside observer or a road user situated outside of the motor vehicle. The use of a light of a colour that is unusual in the field of motor vehicle signalling and the emission of light by mechanisms of the vehicle conventionally not equipped with light sources indeed allow an outside observer to immediately identify that the vehicle 3 is a non-polluting vehicle, equipped with a drive of the hybrid type.

It goes without saying that the control unit can switch on/off the light sources of the devices 31 to 33 independently of the area in which the vehicle 3 is travelling, in such a manner as to always identify the type of drive of the vehicle 3.

Figure 1B:
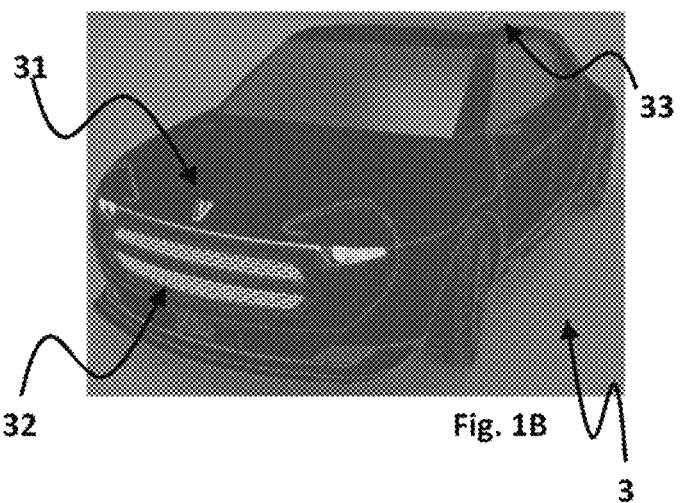
FIG. 1B is a view of a vehicle equipped with a hybrid drive and with several lighting devices according to the invention.
Figure 1C:
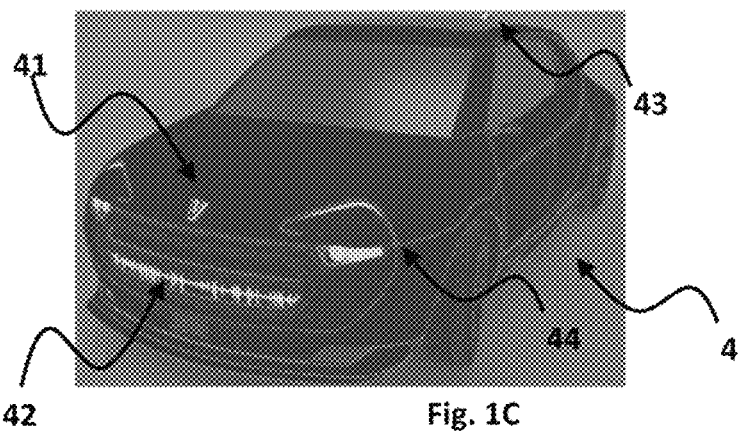
FIG. 1C is a view of a vehicle equipped with an electric motor and with several lighting devices according to the invention.

FIG. 1C illustrates a motor vehicle 4 equipped with a drive of the totally electric type.

This vehicle 3 comprises a first lighting device 41 forming a logo disposed on the bodywork of the vehicle, a second lighting device 42 integrated into a radiator grill of the vehicle and a third lighting device 43 forming a spoiler disposed on an upper part of the bodywork of the vehicle and a fourth lighting device 44 disposed on a part of the bodywork of the vehicle partially surrounding the left front headlamp of the vehicle (a similar lighting device being disposed on a part of the bodywork surrounding the right front headlamp).

The first and third lighting devices 41 and 43 are similar to those of the vehicle 3 in FIG. 1C, with the exception of the light sources which here emit green light.

The second lighting device 42 comprises an optical system (not shown) comprising a light source and a screen, the light source being formed by a matrix of selectively activatable elementary sources, each emitting green light towards the screen.

The fourth lighting device 44 comprises a light source emitting green light, a diffusing screen and an optical fibre disposed behind the diffusing screen and comprising a coupling region for receiving light rays emitted by the light source of the device 44 and coupling them into the optical fibre and a decoupling region extending over the length of the optical fibre for diverting the light rays propagating within the optical fibre towards the screen of the device 44.

The vehicle 4 comprises a control unit for controlling the switching on/off of the light sources of the devices 41 to 44. In particular, the control unit controls the selective activation of the elementary sources of the light source of the device 42, in such a manner that this device 42 displays a specific lighting pattern on its screen.

The emission of light beams with a green colour, different from that of the vehicle 3 in FIG. 1B, and the emission of a specific lighting pattern allow an outside observer to immediately identify that the vehicle 4 is a non-polluting vehicle, distinct from that in FIG. 1B, and hence equipped with a drive of the electric type.

FIGS. 1A to 10 therefore illustrate how a lighting device according to the invention allows various types of drive to be differentiated, via lighting signatures which are distinguished by a specific characteristic associated with a particular type of drive (here the colour of the beam emitted by the device or else the lighting pattern formed by the device).

Figure 2A:
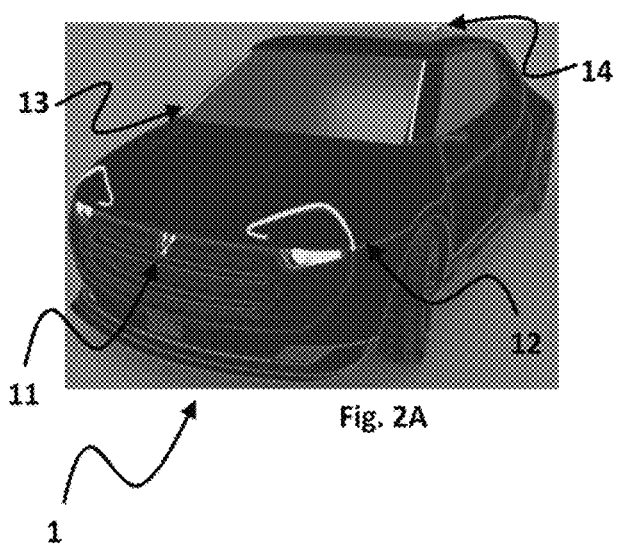
FIG. 2A to 2C are front, rear and side views of a vehicle equipped with an electric motor and with several lighting devices according to the invention.
Figure 2B:
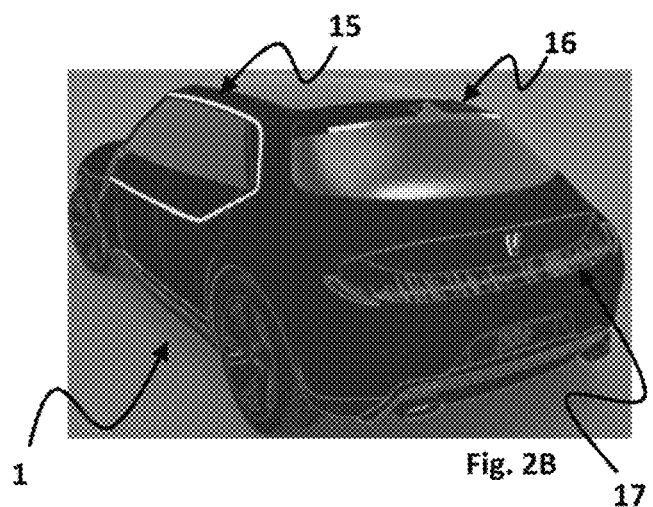
Figure 2C:
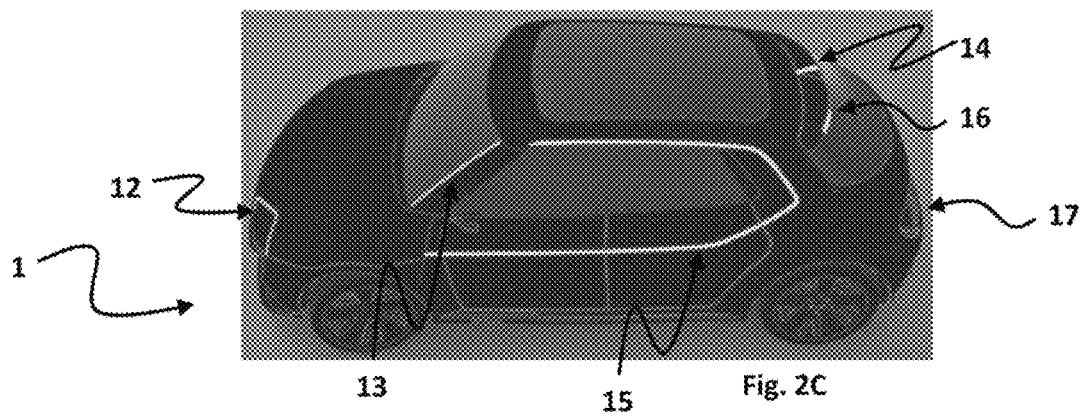

FIGS. 2A, 2B and 2C show various views of a motor vehicle 1, equipped with a drive of the totally electric type and with a plurality of lighting devices 11 to 17 according to the invention.

The lighting device 11 forms a logo disposed on the bodywork of the vehicle, in a similar manner to the lighting device 31 of the vehicle 3 in FIG. 1b.

The lighting device 12 is disposed on a part of the bodywork of the vehicle partially surrounding the left front headlamp of the vehicle, and conforms to the lighting device 44 of the vehicle 4 in FIG. 1C.

The lighting device 14 forming a spoiler is disposed on an upper part of the bodywork of the vehicle, and conforms to the lighting device 33 of the vehicle 3 in FIG. 1B.

The lighting devices 13 and 15 are respectively integrated into a front windscreen pillar and into a side window pillar of the motor vehicle 1, and conform to the lighting device 44 of the vehicle 4 of FIG. 1C.

The lighting device 16 forms a part of a raised stop light. This raised stop light is divided into two lateral parts either side a central part. The lateral parts are equipped with light sources comprising an elementary source emitting green light and an elementary source emitting red light, whereas the central part is only equipped with light sources emitting red light. When there is a need to identify the type of drive of the motor vehicle 1, a control unit of the vehicle 1 controls the switching on of the elementary sources emitting green light, in such a manner that the lateral parts of the raised stop light emit a light beam characteristic of the type of drive of the vehicle 1. The lateral parts thus form the lighting device 16. When it is necessary to implement the regulatory lighting function of a raised stop light, the control unit switches on the elementary sources emitting red light from the lateral parts and from the light sources of the central part, in such a manner that the entirety of the raised stop light carries out this regulatory lighting function of a raised stop light. The lighting device 16 is thus partially incorporated into a regulatory function of the vehicle 1.

The lighting device 17 forms the entirety of a rear light of the motor vehicle 1, extending over the whole width of the vehicle. This lighting device 17 comprises light sources emitting red light and a matrix of micro-mirrors, each micro-mirror being mobile between at least a first position in which a portion of the light rays emitted by these light sources is diverted towards a screen of the lighting device 17 and a second position in which the said portion is diverted towards the interior of the lighting device and is not therefore diverted towards the screen. The control unit of the motor vehicle 1 controls both the emission of light by the light sources of the lighting device 17 and the position of each of the micro-mirrors of this lighting device 17, in such a manner that the lighting device 17 can display a lighting pattern on its screen. Owing to the use of light sources of red light, the whole of the lighting device 17 may therefore carry out the entirety of a regulatory lighting function, for example a stop light or a position light, when this function is necessary, or a lighting pattern identifying the type of drive of the vehicle 1, when this identification is necessary.

The motor vehicle 1 could also incorporate other lighting devices according to the invention, notably on an external wing mirror; on a front headlamp; on a device for illuminating the windscreen; on a device for illuminating a license plate; on an aerial; on a wheel rim; on a chassis or on a door sill.

Figure 3:
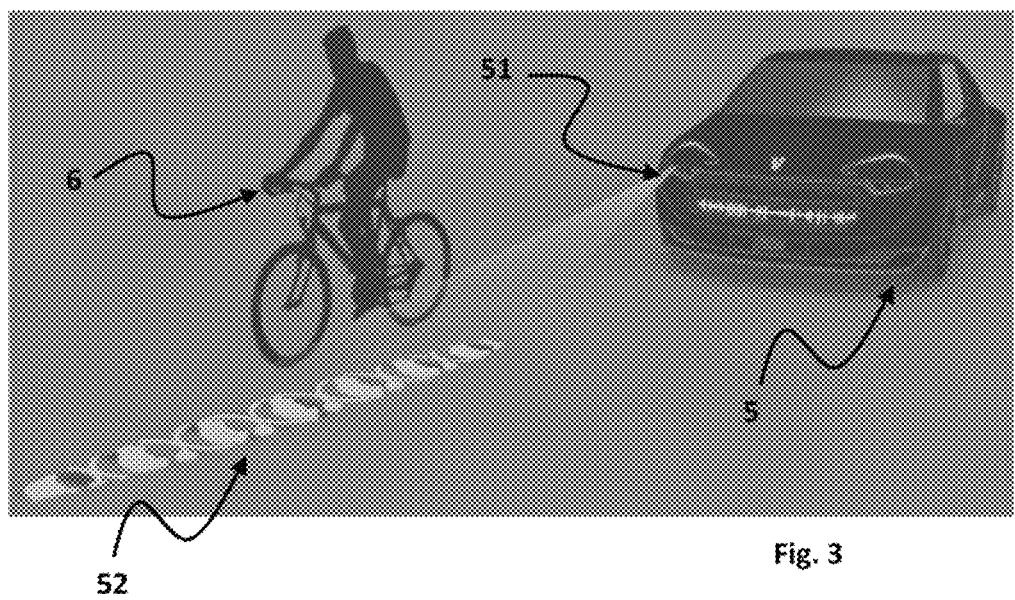
FIG. 3 is a view of a vehicle equipped with an electric motor and with several lighting devices according to the invention.

FIG. 3 shows a motor vehicle 5, equipped with a motor of the totally electric type and with a lighting device 51 according to another embodiment of the invention.

The lighting device 51 comprises an optical system (not shown) comprising a light source of the laser diode type, a microelectromechanical system (MEMS), designed to scan, notably by reflection, light rays emitted by the laser diode over a plate formed from a photoluminescent material, a portion of the said light rays being converted by the plate and another portion being scattered by the plate, all of the converted and scattered portions being diverted by the plate towards an optical projection system projecting all of these converted and scattered portions onto the road in the form of a light beam 52.

The motor vehicle comprises a control unit controlling the emission of light from the laser diode and the movements of the microelectromechanical system, such that the laser diode emits light in a manner synchronized with the scanning of this light over the plate made of photoluminescent material, the light beam resulting from the projection of the light rays converted and scattered by this plate thus forming a specific lighting pattern 52.

The control unit is equipped with means for detecting the presence of a road user 6 and for determining the position of the road user 6.

Since the motor vehicle 5 is a vehicle with an at least partially electric propulsion, the sound level that it generates when being driven is very low and melts into in the ambient noise of its environment. The control unit therefore controls the lighting device 51 for the emission of a lighting pattern 52 towards the road user 6, so as to indicate to them that the said motor vehicle 5 is travelling in their direction. The road user 6 is accordingly warned of the presence of the said vehicle 5, despite its silent movement.

It goes without saying that the invention is not limited to the examples which have just been described and many modifications may be applied to these examples without straying from the scope of the invention. Notably, the various features, forms, variants and embodiments of the invention may be associated with one another according to various combinations as long as they are not mutually incompatible or exclusive. In particular, all the variants and embodiments described hereinabove may be combined with one another.

The invention claimed is:

1. A lighting device that emits at least one light beam, at least one characteristic of the light beam being indicative of a type of propulsion being utilized by a motor vehicle, the lighting device emitting the light beam at least when the motor vehicle is moving, the characteristic being variable as a function of a variation over time of a pollution factor of the vehicle.

2. The device according to claim 1, wherein the lighting device is arranged so that the light beam indicates, to an observer outside the vehicle, a type of drive of the motor vehicle.

3. The device according to claim 2, wherein the device is arranged to emit the light beam when the motor vehicle is moving within a predetermined traffic area.

4. The device according to claim 2, wherein the lighting device is arranged so that the characteristic indicating the type of propulsion of the motor vehicle is a wavelength of the light beam emitted by the lighting device.

5. The device according to claim 2, wherein the lighting device is arranged so that the characteristic indicating the type of propulsion of the motor vehicle is a frequency of a pulsation in the light beam emitted by the lighting device.

6. The device according to claim 2, wherein the lighting device is arranged so that the characteristic indicating the type of propulsion of the motor vehicle is a pattern formed by the light beam emitted by the lighting device.

7. The device according to claim 2, the motor vehicle being a vehicle with an at least partially electric propulsion, wherein the lighting device is arranged so that the light beam indicates movement of the motor vehicle to a road user.

8. A motor vehicle, comprising a lighting device according to claim 2.

9. The device according to claim 1, wherein the lighting device is arranged to emit the light beam when the motor vehicle is moving within a predetermined traffic area.

10. The device according to claim 1, wherein the lighting device is arranged so that the characteristic indicating the type of propulsion of the motor vehicle is a wavelength of the light beam emitted by the lighting device.

11. The device according to claim 1, wherein the lighting device is arranged so that the characteristic indicating the type of propulsion of the motor vehicle is a frequency of a pulsation in the light beam emitted by the lighting device.

12. The device according to claim 1, wherein the lighting device is arranged so that the characteristic indicating the type of propulsion of the motor vehicle is a pattern formed by the light beam emitted by the lighting device.

13. The device according to claim 1, the said motor vehicle being a vehicle with an at least partially electric propulsion, wherein the lighting device is arranged so that the light beam indicates movement of the motor vehicle to a road user.

14. The device according to claim 13, wherein the lighting device is arranged so as to project the light beam towards the road user.

15. The device according to claim 13, wherein the lighting device is arranged so as to project the light beam onto an area surrounding, partially or completely, the motor vehicle.

16. A motor vehicle, comprising a lighting device according to claim 1.

* * * * *